United States Patent
Yellapragada et al.

(10) Patent No.: US 11,657,305 B2
(45) Date of Patent: May 23, 2023

(54) MULTI-METHOD SYSTEM FOR OPTIMAL PREDICTIVE MODEL SELECTION

(71) Applicant: Cloud Software Group, Inc., Fort Lauderdale, FL (US)

(72) Inventors: Venkata Jagannath Yellapragada, Jersey City, NJ (US); Thomas Hill, Tulsa, OK (US); Daniel Rope, Reston, VA (US); Michael O'Connell, Durham, NC (US); Gaia Valeria Paolini, Canterbury (GB); Tun-Chieh Hsu, Hoboken, NJ (US)

(73) Assignee: CLOUD SOFTWARE GROUP, INC., Fort Lauderdale, FL (US)

( * ) Notice: Subject to any disclaimer, the term of this patent is extended or adjusted under 35 U.S.C. 154(b) by 326 days.

(21) Appl. No.: 16/895,337

(22) Filed: Jun. 8, 2020

(65) Prior Publication Data
US 2020/0387814 A1    Dec. 10, 2020

Related U.S. Application Data (60) Provisional application No. 62/858,165, filed on Jun. 6, 2019.

(51) Int. Cl.
G06N 5/04     (2023.01)
G06N 20/00    (2019.01)
G06N 20/20    (2019.01)

(52) U.S. Cl.
CPC ............... *G06N 5/04* (2013.01); *G06N 20/00* (2019.01); *G06N 20/20* (2019.01)

(58) Field of Classification Search
CPC ........... G06N 5/04; G06N 20/00; G06N 20/20
USPC .......................................................... 706/12
See application file for complete search history.

(56) References Cited

U.S. PATENT DOCUMENTS

| | | | |
|---|---|---|---|
| 2005/0234698 A1* | 10/2005 | Pinto | G06Q 30/02 703/22 |
| 2006/0282306 A1 | 12/2006 | Thissen-Roe | |
| 2007/0061735 A1* | 3/2007 | Hoffberg | G06V 40/103 715/744 |
| 2012/0191630 A1 | 7/2012 | Breckenridge et al. | |

(Continued)

OTHER PUBLICATIONS

International Search Report and Written Opinion dated Aug. 19, 2020 in related International Application No. PCT/2020/036688.

*Primary Examiner* — Darryl V Dottin
(74) *Attorney, Agent, or Firm* — McGuireWoods LLP (57) ABSTRACT

A system for generating algorithmic models comprising a function module to generate a desirability function, an automated machine learning module, and a UI module. The desirability function defines a single desirability value based on an algorithmic model accuracy criteria, criteria for algorithmic model quality, criteria for model fidelity, and criteria for the benefits and cost of model deployment. Specific hard and soft constraints regarding these and other user-defined criteria can also be specified by the user. The automated machine learning module generates an algorithmic model by training the algorithmic model against a model data set, identifying the model with the greatest desirability with respect to all criteria as combined via the desirability function. The UI module generates a user interface to display the overall desirability as well as all model criteria configured by the user. The displayed criteria and desirability are selectable and definable.

17 Claims, 5 Drawing Sheets

(56) References Cited

U.S. PATENT DOCUMENTS

| | | |
|---|---|---|
| 2014/0081652 A1 | 3/2014 | Klindworth |
| 2015/0170049 A1 | 6/2015 | Mann et al. |
| 2019/0095810 A1 | 3/2019 | Chakraborty et al. |

\* cited by examiner

FIG. 1A

RESULTS - AutoML CLASSIFICATION TRAINER

| LEADERBOARD | MODEL TYPE | MODEL PARAMETERS | MODEL PERFORMANCE |
|---|---|---|---|
| BEST MODEL | GBTC | subsamplingRate:0.4 maxDepth:4 | 0.6798 |
| | GBTC | subsamplingRate:0.7 maxDepth:10 | 0.6792 |
| | GBTC | subsamplingRate:0.7 maxDepth:4 | 0.6748 |

FIG. 1B

| ModelType | ModelParameters | PERFORMANCE | INTERPRETABILITY SCORE | BIAS SCORE | SIMULATION SCORE | OVERALL DESIRABILITY |
|---|---|---|---|---|---|---|
| AI/ML MODEL 1 | PARAMETER SET 1 | 0.68 | 0.9 | 0.3 | 0.7 | 0.90 |
| AI/ML MODEL 1 | PARAMETER SET 2 | 0.70 | 0.8 | 0.4 | 0.6 | 0.89 |
| AI/ML MODEL 1 | PARAMETER SET 3 | 0.68 | 0.9 | 0.8 | 0.7 | 0.86 |
| AI/ML MODEL 2 | PARAMETER SET 1 | 0.72 | 0.9 | 0.8 | 0.5 | 0.65 |
| AI/ML MODEL 2 | PARAMETER SET 2 | 0.73 | 0.8 | 0.9 | 0.3 | 0.40 |
| AI/ML MODEL 2 | PARAMETER SET 3 | 0.74 | 0.9 | 0.9 | 0.1 | 0.25 |

BEFORE - SINGLE CRITERION DECISIONS ON MODELS

AFTER - EXAMPLE OF SELECTION CRITERION BASED ON OVERALL MODEL DESIRABILITY

FROM FIG. 2A

ASSIGN WEIGHTS, HARD LIMITS, FOR: 52
1. FOR EACH CONSTRAINT, DEFINE IF IT IS A HARD (MUST-COMPLY-WITH) CONSTRAINT OR A SOFT (CAN-BE-VIOLATED) CONSTRAINT
2. DEFINE WEIGHTS DENOTING IMPORTANCE FOR EACH MODEL EVALUATION CRITERION

A CONSTRAINT MARKED AS A "HARD" MEANS MODELS THAT VIOLATE THE CONSTRAINT WILL BE ELIMINATED FROM CONSIDERATION. A CONSTRAINT MARKED AS "SOFT" MEANS THAT A PENALTY VALUE (WEIGHT) WILL BE ASSIGNED TO THE RESPECTIVE MODEL(S)

DEFINE OVERALL MODEL DESIRABILITY, PERFORM WHAT-IF/SCENARIO ANALYSIS OF OVERALL MODEL DESIRABILITY 54
1. DEFINE OVERALL MODEL DESIRABILITY FUNCTION AND VERIFY THAT ALL MODEL EVALUATION CRITERIA AND CONSTRAINTS, ARE REFLECTED IN AN OVERALL DESIRABILITY VALUE
2. USE DEDICATED UI TO EXPLORE VISUALLY, THE EFFECT OF ACCURACY, COST, MISCLASSIFICATION RATES, ETC. ON OVERALL MODEL DESIRABILITY. IN THAT PROCESS, THE USER CAN DEFINE SPECIFIC CHANGES (BIASES) IN THE INPUT DISTRIBUTIONS, TO EVALUATE THE EFFECT ON DESIRABILITY (FOR EXAMPLE, IF DIFFERENT AGE GROUPS/STRATA OF RESPONDENTS ARE CHARACTERIZED BY DIFFERENT EXPECTED CUSTOMER VALUE, THE USER CAN CHANGE THE AGE DISTRIBUTION OF SIMULATED INPUT CASES TO REVIEW THE IMPACT ON VARIOUS OUTCOME METRICS, INCLUDING DEPLOYMENT COST, VALUE, ACCURACY, OVERALL DESIRABILITY AND SO ON)

DEFINE THE OVERALL MODEL DESIRABILITY, REFLECTING ALL COSTS, RISKS (e.g., FOR DISCRIMINATORY IMPACT), CONSTRAINTS ETC. (VALUE) AS PREVIOUSLY SPECIFIED. A DEDICATED UI THEN PROVIDES THE OPPORTUNITY TO EXPERIMENT WITH USER-DEFINED VALUES FOR MODEL ACCURACY, COMPLEXITY, DEPLOYMENT COST, ETC., FOR HYPOTHETICAL OR EXISTING MODELS, AND TO REVIEW THE OVERALL DESIRABILITY OF MODELS. THE USER CAN PERFORM WHAT-IF OR SCENARIO ANALYSIS OF THE PROPERTIES OF HYPOTHETICAL MODELS TO ASSESS THE IMPACT OF THE CHOSEN CRITERIA FOR MODEL DESIRABILITY

RUN MODEL BUILDING PIPELINE: 56
1. RUN MODEL BUILDING: WITH CRITERIA / CONSTRAINTS REFLECTED IN MODEL- BUILDING PARAMETERIZATION WHERE POSSIBLE (e.g., COST FUNCTIONS IN TREE MODELS)
2. PRESENT FINAL MODEL LIST TO END USER OR AUTOMATION INTERFACE, IN THE ORDER OF OVERALL MODEL DESIRABILITY
3. REPEAT STEPS DEFINED HERE TO REFINE OR REDEFINE DESIRABILITY FUNCTION, AND PERFORM WHAT-IF (DESIRABILITY) ANALYSIS OF MODELS

MULTI-METHOD SYSTEM FOR OPTIMAL PREDICTIVE MODEL SELECTION

CROSS-REFERENCE TO RELATED APPLICATIONS

This application claims priority to U.S. Provisional Patent Application 62/858,165 titled "MULTI-METHOD SYSTEM FOR OPTIMAL PREDICTIVE MODEL SELECTION," filed 6 Jun. 2019, which is incorporated by reference herein in its entirety for all purposes.

BACKGROUND

Companies around the world are using Artificial Intelligence (AI) and Machine Learning (ML) to predict anomalies, improve efficiency and maximize profits. Typically, the adoption of data-driven AI/ML technologies into an organization's business processes requires significant adjustments, as well as changes to operational support structures. This topic is widely acknowledged and discussed; see, for example:

Forbes Nov. 30, 2018—"Why Transforming Your Organization Using Data Science Must Come From The Top" https://www.forbes.com/sites/forbestechcouncil/2018/11/30/why-transforming-your-organization-using-data-science-must-come-from-the-top/#365af652da87); and Harvard Business Review August 2017—"How to make AI work for your business" https://www.mckinsey.com/business-functions/mckinsey-analytics/our-insights/how-to-make-ai-work-for-your-business.

Most of the discussion of how businesses must change in order to successfully deploy AI/ML focuses on organizational support, methods to identify and secure "early wins" (successes), and how to generally align AI/ML activities with organizational goals and outcomes. However, in practice, the task of actually building and selecting AI/ML models is usually assigned to designated analysts or data scientists, who leverage modeling/analytics software (1) to build "accurate" models for measured responses such as intention-to-purchase, fraud, machine-failure or maintenance requirements, anomalies of different types, or (2) to identify structure in the data, including deviations from expected patterns.

Practically all implemented AI/ML algorithms commonly provide options to use accuracy, or indices directly related to accuracy, for evaluating and comparing predictive models They either prompt analysts to select, or automatically select the most accurate model for deployment; see for example:
  https://en.wikipedia.org/wiki/Model_selection; or
  https://en.wikipedia.org/wiki/Evaluation_of_binary_classifiers.

So-called "competitive-evaluation-of-models" approaches and "auto-ML-methods" automatically apply various ML algorithms and strategies to available training data, and evaluate the accuracy of different models in a hold-out or test sample. The test sample is used only for model evaluation and not for actual model building, in order to provide information about differential model accuracy.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

Accuracy is rarely the most instrumental metric for choosing between different ML/AI models, in order to achieve maximum value of a prediction model for an organization. Only recently have there been attempts to incorporate cost and ROI as criteria for selecting a "best model" from among multiple prediction models that were generated using traditional general accuracy criteria; however, that approach does not capture the real challenge of aligning model building and selection with organizational priorities, requirements, and goals.

There is a clear disconnect between the accuracy-based evaluation of ML/AI prediction models and the overall goals and practical constraints of virtually all organizations that want or need to use such models. For example, a most accurate prediction model may:
  be too complex and thus unsuitable for deployment in low-latency streaming data (e.g., consider ensemble models and low latency robotics systems);
  be sufficiently complex that the computing cost of scoring new data would be higher than the expected Return on Investment (ROI) on doing such scoring;

require specific expensive data for inputs, so that using that model would be too expensive compared to expected ROI;

not generate predictions following distributions as they are observed in the real data, rendering the chosen model unsuitable for high-fidelity what-if scenario analyses, simulations of processes, or optimization projects (all common in Industry 4.0 applications);

not be compatible with specific business, legal, or combinations of other hard or costly soft constraints; and be less accurate for specific (discrete, continuous) values or ranges of values for specific predictors, where the accuracy is of greatest value; such biases with respect to accuracy for specific observations may also lead to undesirable biases and adverse discriminatory impact when the model is applied in production.

In order to maximize the business value of a best model for an organization or specific process, other metrics such as data acquisition (cost of data), model complexity, model evaluation criteria, risks for bias or discriminatory impact, deployment costs, and other model properties all must align with business goals, resources, constraints, and desirable business outcomes. Otherwise, ML and AI algorithms may result in very accurate models that will nevertheless fail to deliver value (ROI—Return On Investment) to an organization, or worse, cause losses.

Currently available commercial and open-source solutions for automatic model building and automatic selection of best models, such as those implemented in:

H2O Driverless AI (https://www.h2o.ai/products/h2o-driverless-ai/);
auto-sklearn (https://github.com/automl/auto-sklearn);
auto-keras (https://github.com/keras-team/autokeras);
MLBox; (https://github.com/AxeldeRomblay/MLBox); and many commercial solutions are focused on the technical challenges of building and/or finding the most accurate prediction model. In the AI/ML industry, they are represented to be Automatic Machine Learning systems, and referred to as AutoML based systems.

Presented herein is an apparatus, system, and method for producing algorithmic models used for generating predictive analytics from a model data set for a process, e.g. a business process. The apparatus, system, and method significantly improves and expands on the currently available state-of-the-art systems, i.e. AutoML based and other systems for generating and evaluating prediction models, by aligning automatic or other methods and best practices for generating machine learning models with specific business outcomes and constraints. This in turn will significantly shorten the time from defining a business problem that can be addressed using Machine Learning and AI, to the successful and continuously sustainable deployment of ML/AI-based solutions given current business constraints. Therefore, the apparatus, system, and method will facilitate faster and greater actual value and ROI to businesses and others.

The concept of "desirability" has a long documented history in the area of applied statistics, to inform decisions about the best choices for values of inputs into prediction models for multiple outputs or KPI's, each with its own target characteristics and constraints; see for example Derringer, G. and Suich, R., 2018, Journal of Quality Technology, Volume 2, pp 214-219.

Stated at www.itl.nist.gov/div898/handbook/pri/section5/pri5322.htm: "The desirability function approach is one of the most widely used methods in industry for the optimization of multiple response processes. It is based on the idea that the 'quality' of a product or process that has multiple quality characteristics, with one of them outside of some 'desired' limits, is completely unacceptable. The method finds operating conditions that provide the 'most desirable' response values."

In general, the formulas that are proposed combine into a single desirability value the desirability of specific values or value ranges for multiple measured or ranked KPI's (Key Performance Indicators) or quality criteria. The values that make up the single desirability value, which is a function of quality criteria, can be classified as a cost, a neutral, a benefit, or something there between. In this disclosure, term value and benefit with respect to a value associated with a criterion have the same meaning and may be used interchangeably.

Figure 2A:
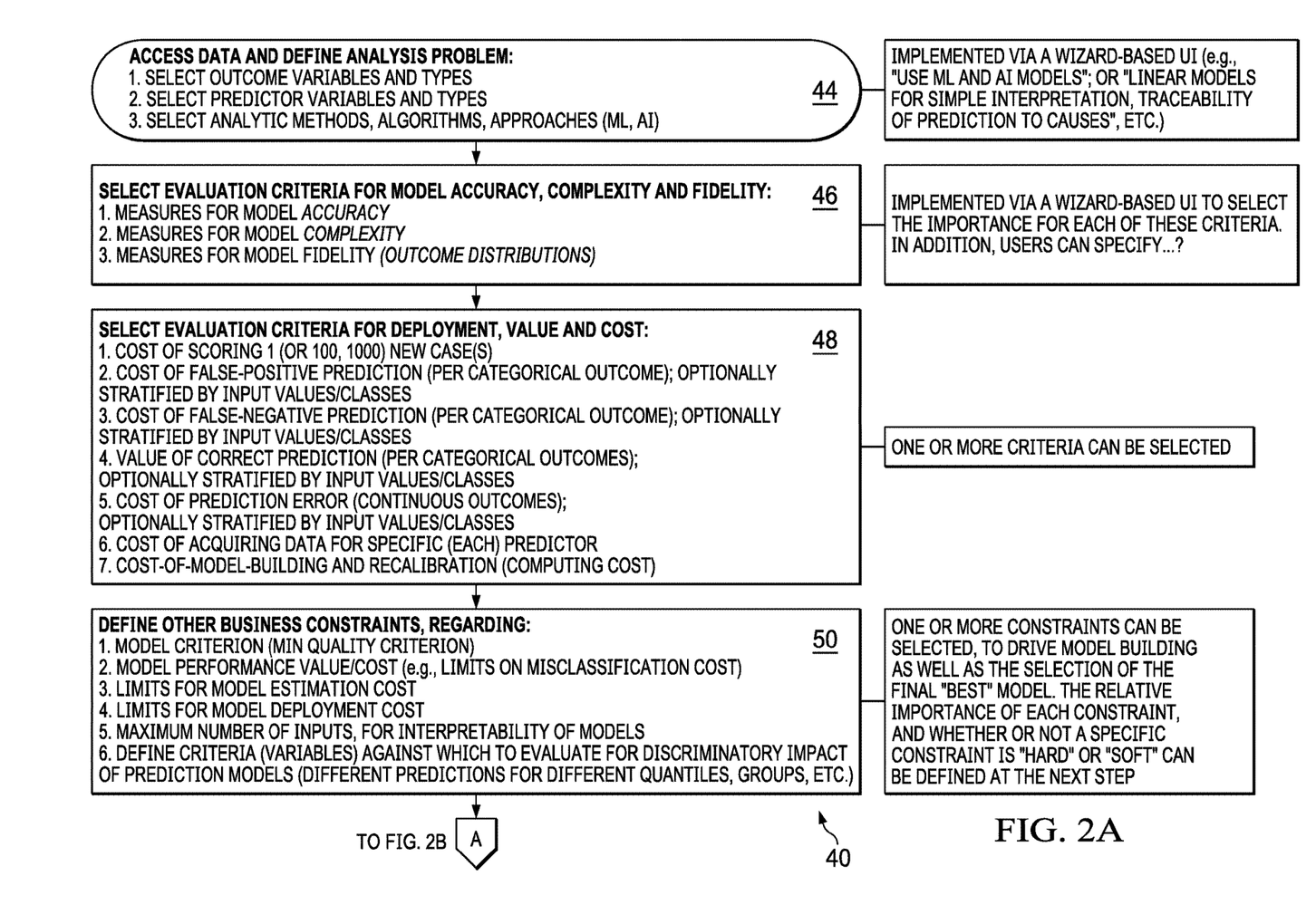
FIGS. 2A-2B are illustrations of an algorithmic flow diagram of logic for the algorithmic model generator, in accordance with certain example embodiments.
Figure 2B:
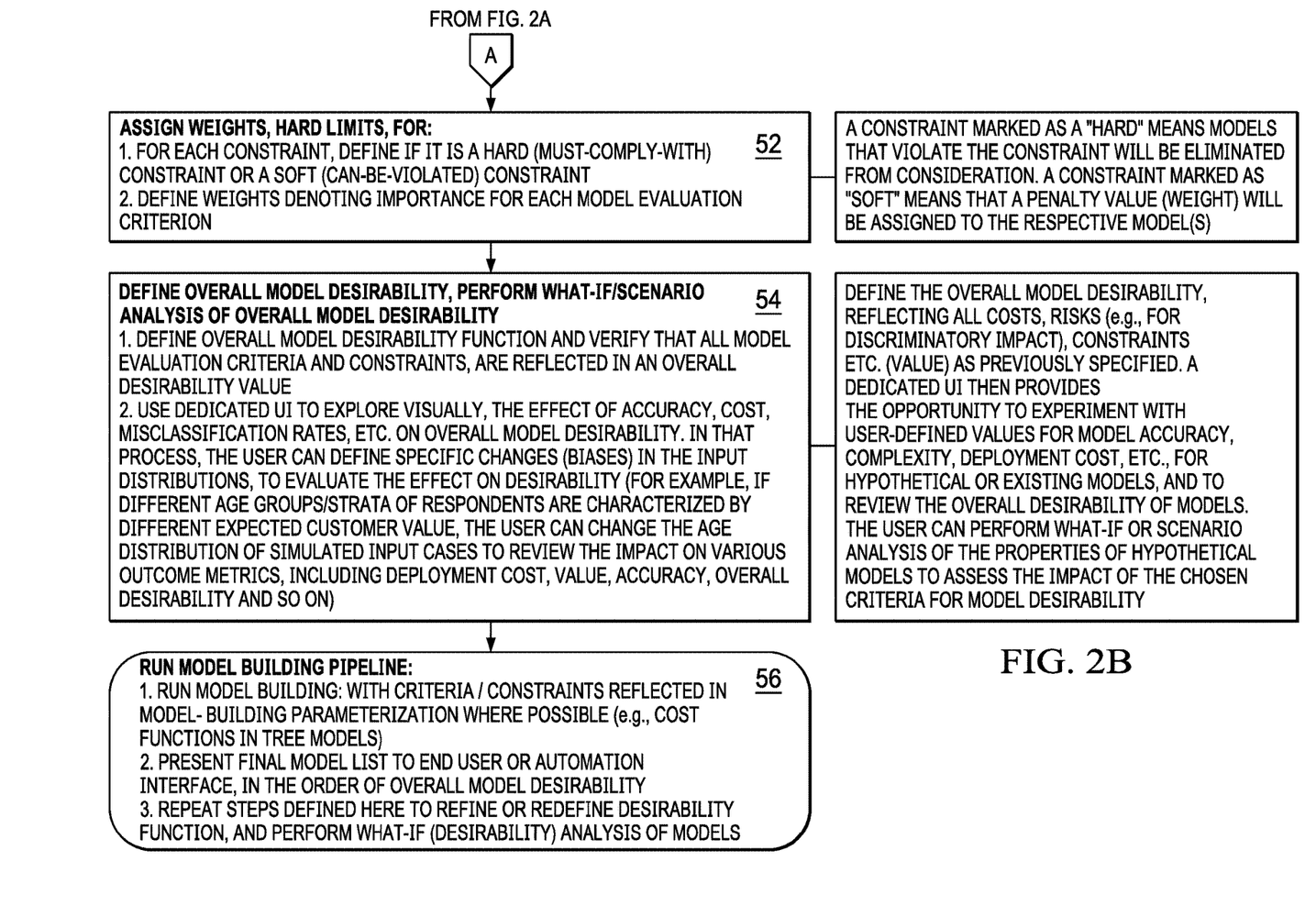

The current disclosure applies these formulas to a system and method in which multiple KPI's that are commonly associated with or constraining the quality and application of prediction models, as described in FIGS. 2A and 2B, blocks 46 through 54. The rated or measured importance for multiple criteria that will affect the overall desirability associated with prediction models as described in FIG. 2A and FIG. 2B, can be combined into a single value of desirability for each prediction model, using known or user-supplied equations for computing overall desirability from the ranges or measured evaluation criteria such as the value or cost of individual KPI's.

The equations provided by Derringer and Suich as referenced above provide one example of how the desirability values or value ranges over multiple criteria can be combined into a single desirability value. Because the desirability over multiple criteria are combined by computing a geometric average (through the multiplication of individual desirability values, scaled to a range from 0.0 to 1.0), if any one criterion has a desirability of 0 (zero), the desirability of the respective prediction model is also 0 (zero), and thus undesirable. This is just one of the possible approaches to combine different KPI's into a single desirability value.

With this approach, models selected based on multiple evaluation criteria, such as cost, consistency with organization's goals, Key Performance Indicators (KPI's), constraints, and potential risks, or any combination of criteria thereof, are aligned and unified with processes and methods that are used to build and select AI/ML models for deployment. The model building process, as well as other properties of the AI/ML models, are considered inputs to a multi-objective optimization problem reflecting model desirability which is a function of multiple evaluation criteria such as model accuracy or deployment cost as well as the expected benefits of models, while also reflecting in the overall model desirability values applicable constraints with respect to performance requirements and resources, as well as possible liabilities and risks, e.g., due to unintended discriminatory impact or inaccuracies in certain input regions of an algorithmic model.

When building and selecting AI/ML models, the apparatus, system, and method for generating algorithmic models used for generating predictive analytics from a model data set for a process considers the desirability of models, based on each of the following criteria (not exhaustive):

the cost of acquiring data elements necessary to score new observations;
hidden patterns in sub-regions of the dataset;
model inputs and outputs based on user-defined constraints;
model complexity and the time required to score a new observation;

model complexity and the cost associated with scoring a new observation;

model complexity and the cost/time required to build and/or recalibrate the model;

the costs of false positives and false negatives in operations;

the risks associated with biases in model predictions, or discriminatory impact if the model were to be deployed for automatic decision making in production;

the fidelity of the distributions of predictions with respect to actual distributions of values; and statistical and prediction-accuracy-derived performance indicators.

Thus, through the use of computed overall model desirability value as discussed above, the apparatus, system, and method considers various statistical and business metrics as well as constraints guiding automated machine learning machinery while it trains, evaluates, and compares suitable AI/ML models. In this disclosure, AI/ML models and prediction models are the same and may be used interchangeably. The apparatus, system, and method guides a user and drives automation to select the best AI/ML model(s) for deployment, given the expected business value associated with the selected model while also considering business requirements and constraints.

A desirability function is a function used and well understood in the area of statistics and data science. The desirability function defines the mapping of values and value ranges over different evaluation criteria into the overall desirability value for a prediction model with respect to the respective organizations' goals, policies, or other key performance indicators. Criteria, such as scoring cost or model accuracy and others described in previous paragraphs, are the dimensions that must be considered by the respective organization in order to assess the overall desirability of a model. A constraint defines permissible values or value ranges for criterion, criteria or combinations of criteria. Constraints can be hard constraint or soft. A hard constraint, for example, can be one where the desirability of the prediction model will be 0 (zero) if the value of a criterion falls outside the permissible bound defining the constraint (e.g., a specific model may have a discriminatory impact that is greater than what is allowed by law, and hence cannot be chosen and used by the organization). A soft constraint, for example, can be one where certain value ranges of criteria or combination of criteria will make a model increasingly less desirable. For example, if the cost of scoring a single new case, row, or instance given a certain prediction model exceeds some value, then the degree to which the cost of scoring exceeds that value will rapidly decrease the desirability of that model towards 0 (zero). The desirability function can transform specific measured or assigned values for criterion or criteria, circumstances, facts, or influences into a numeric value that indicates overall desirability with respect to the undesirable consequences and desired benefits that are expected to accrue to the business or organization when the respective prediction model is used for scoring new data, and when those predictions in turn are used to inform process decisions that will affect organizational outcomes. Criterion values that map to small desirability values make a respective model less desirable; criterion values that map to larger desirability values make the respective model more desirable.

AutoML is a research area dedicated to automating the process of building complex algorithmic models. AutoML, i.e. automated machine learning, module, as used herein, relates AutoML based systems. These systems are software solutions that address various areas of the automation process. These software solutions are currently available in the open source as well as the commercial market. Observation in this specification means a logical row in a data set. A predictor variable in this specification means an independent variable used in algorithmic models that provides information on dependent variable for a defined outcome. An outcome variable is a dependent variable that change in response to changes of an input variable. The language at least one of is meant to be interpreted to as being either conjunctive or non-conjunctive. In other words, at least one of A and B should be interpreted to include both A and B or only A or only B.

An algorithm is the specific computational method used to estimate the parameters of a prediction model. An analytic method refers to the process by predictive models are generated, for example, by using automatic machine learning (AutoML) or by selecting a-priori certain statistical or machine learning algorithms to use for building predictive models from model training data. An analytic approach defines a category of algorithm for a specific purpose or having certain common characteristics; for example, there are analytic approaches for classification tasks, that include many machine learning algorithms suitable for predicting classifications such as whether or not a credit card customer will or will not default on debt payments, or image classification; or, for example, there are analytic approaches for regression tasks, that include many algorithms for regression prediction of continuous outcome variables. There are many ways how machine learning algorithms can be classified into types of analytic approaches, and the specific manner by which analytic approaches can be defined is usually domain specific (different in different business domains).

Figure 1A:
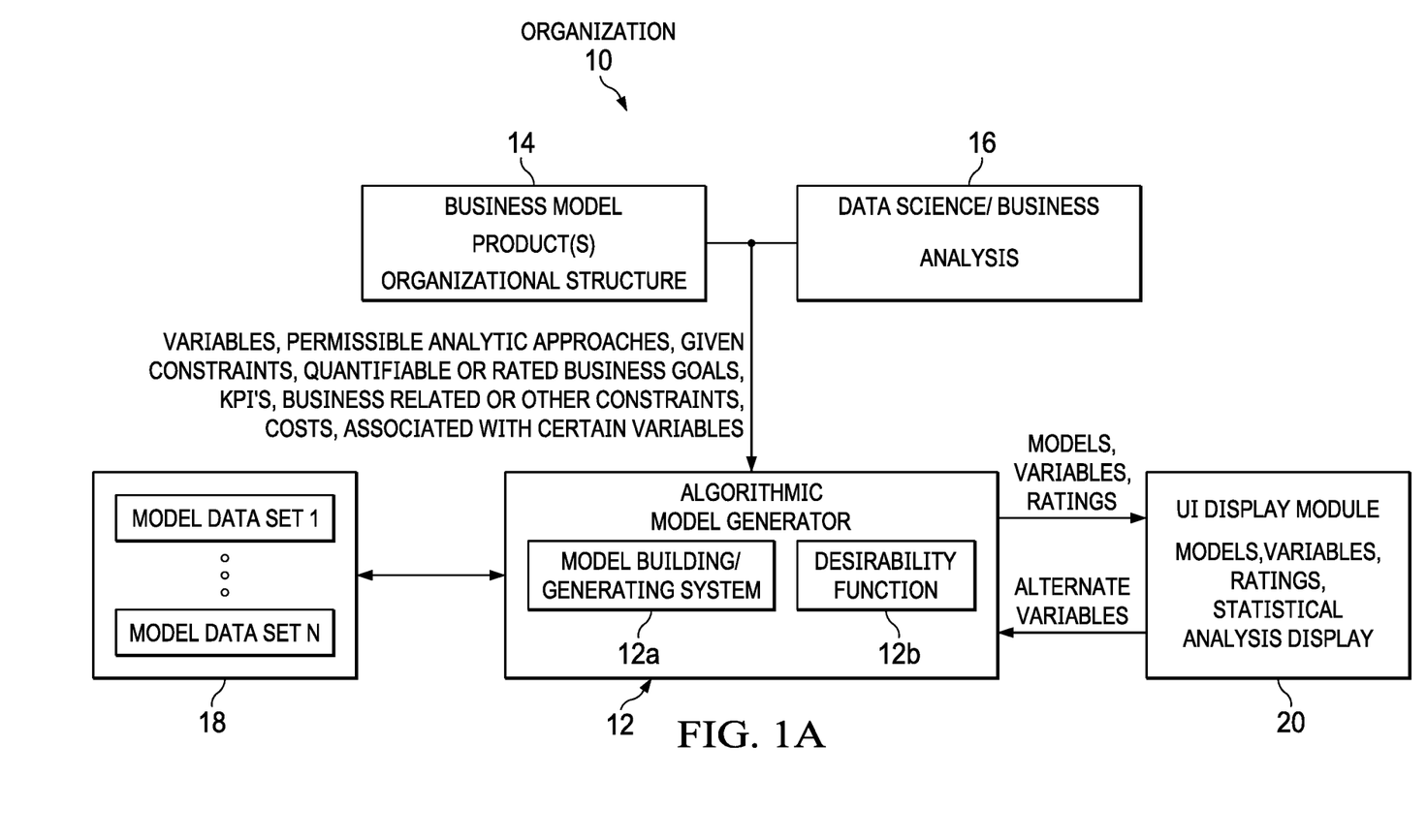
FIG. 1A is an illustration of a block diagram of a system for generating algorithmic models used for generating predictive analytics from a model data set for a process, in accordance with certain example embodiments.

Referring now to FIG. 1A, illustrated is a block diagram of a system for generating algorithmic models used for generating predictive analytics from a model data set for a process, according to certain example embodiments, denoted generally as 10. The system 10 comprises an algorithmic model generator 12, a business model 14, data science and business analysis input module 16, a plurality of model sets 18, and a display generator 20. In essence, the system 10 generates algorithmic models, predictive results, i.e. observations, and metrics based off of predefined criteria using a business model relevant to a particular process, such as a business model for a banking operation, predictor variables, and outcome variables.

The business model 14 is a data set of variables that describe a process, such as organizational structure encompassing an organization's departmental structure, processes, and products. The data science and business analysis module 16 is a module that allows a user to enter select variables, such as predictor variables and predictor variable types and outcome variables and outcome variable types, model analytics type, algorithmic model accuracy criterion or criteria, evaluation criterion or criteria for algorithmic model quality, and an evaluation criterion or criteria that will impact model desirability. The algorithmic model generator 12 comprises an AutoML based or other systems equivalent thereto for generating prediction models 12a and a desirability function module 12b. The model data set 18 is a database repository comprising model data sets relevant to a business model that are used to train algorithmic models to obtain predictive results for certain predictor and outcome variables and types. The Display generator 20 is an interactive graphics display and programmed User Interface (UI) module that generates graphical displays for displaying the algorithmic models, graphs, charts, criterion and criteria, and variables generated from the algorithmic model generator 12 and provides user feedback to the algorithmic model generator 12.

Figure 1B:
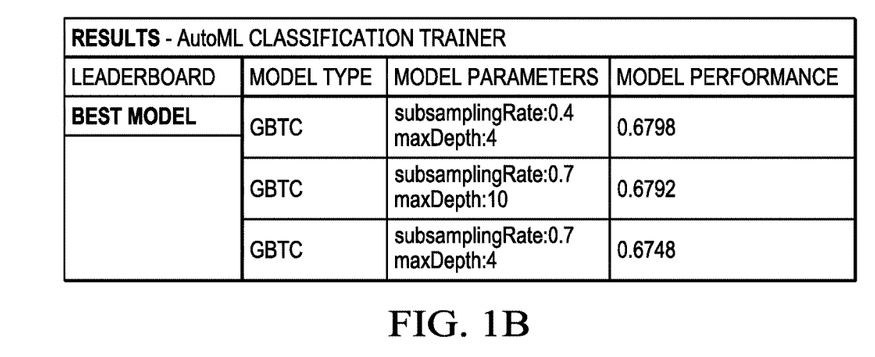
FIG. 1B is an illustration of UI module generated metrics to display at a display module for a group of identified or generated predictive models where an AutoML based system uses only a single model performance criterion to generate or identify the predictive models, in accordance with certain example embodiments.
Figure 1C:
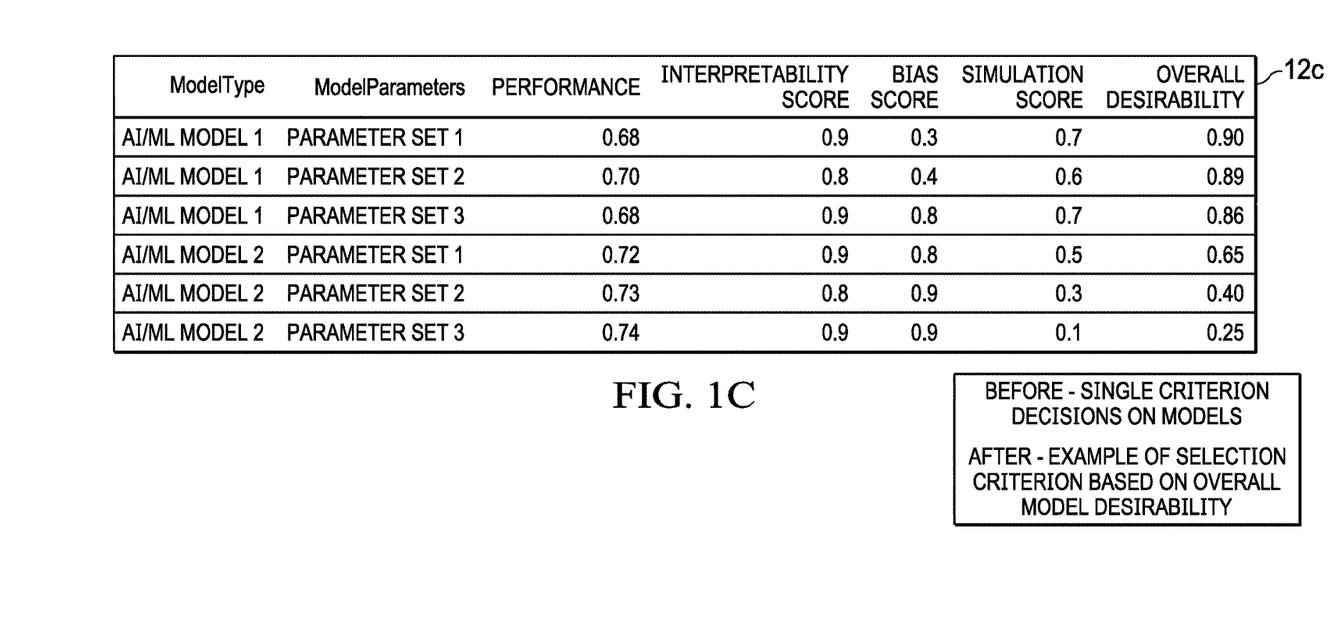
FIG. 1C is an illustration of UI module generated metrics to display at a display module for a group of identified or generated predictive models where an AutoML based system and desirability function module uses multivariate criteria to generate or identify the predictive models, in accordance with certain example embodiments.

In an embodiment, the desirability function module 12b processes outcome and predictor variables, outcome and predictor variable types, model analytics types, algorithmic model accuracy criterion or criteria, evaluation criterion or criteria for algorithmic model quality, and an evaluation criterion or criteria that will affect model deployment desirability, such as but not limited to the monetary costs, value, risks, degree of compliance with policy or regulatory requirements, and others as enumerated in 48-52 of FIG. 2a and FIG. 2b, in order to generate a desirability function. The Model Building/Generating or automatic AutoML based system 12a samples the model data sets to generate a set of trained algorithmic models and predictive results, i.e. observations, based on outcome, input and predictor variables, outcome, input and predictor variable types, model analytics types, and the desirability function provided by the desirability function module 12b. The display generator 20 generates an interactive logical interface using a graphical display language, such as a java based HTML (Hypertext Markup Language), and syncs the interface with the display module 20. FIG. 1B is an illustration of display generator 20 generated metrics for a group of identified or generated predictive models where the Model Building/Generating or AutoML based system 12a uses only performance criterion to generate or identify the predictive models. FIG. 1B is an illustration of display generator 20 generated metrics for a group of identified or generated predictive models where the Model Building/Generating or AutoML based system 12a and desirability function module 12b uses multivariate criteria to generate or identify the predictive models.

The algorithmic model generator 12 can build predictive models based on the model data sets 18 and user provided input variables and outcome variables for predicting the outcome variable from the input variables, as chosen by a respective organization. The input variables can be independent variables (causation related) and predictor variables. The algorithmic model generator 12 can implement a fully automated AutoML system as previously described, or it can cycle over a list of different analytic approaches or algorithms. Further, the Model Building/Generating or AutoML based system 12a can use the desirability function module 12b to generate at least one algorithmic model; for example, the Model Building/Generating or AutoML based system 12a can use an overall desirability value or values generated by the desirability function module 12b based on certain criteria or criterion, e.g. cost of misclassifying (predicting incorrectly) a row or case, depending on the specific category to which the respective case belongs and the specific category to which it was misclassified, to generate predictive classification models that satisfy the overall desirability value or values. However, even if the model generated is not generated based on criteria, each generated model can be associated with specific values for specific criteria as previously discussed; those criteria can be converted into a desirability value for each algorithmic model by the desirability function depicted in 12b. The resulting table of prediction models, the values of associated criteria for each model, and the value of the overall desirability for each model is then displayed to the user via display generator 20. The user can review these results via display generator 20 for each model and choose a model or configure the system and UI to choose automatically the most desirable model for final deployment for the respective designated business process where the respective prediction model is to be applied. Details of the results, values of criteria, and desirability values can be displayed through display generator 20. Display generator 20 also allows users to manually select different variables or choose to modify the specific algorithms and analytic approaches used in the algorithmic model generator block 12.

Referring now FIGS. 2A-2B, illustrated is an algorithmic flow diagram of logic for the algorithmic model generator 12, denoted generally as 40. At block 44, based on a particular process, outcome variables, outcome types, predictor variable, predictor variable types, input variables, input variable types, and analytic methods, algorithm types, and approaches for ML, AI, or linear models for simple interpretation and traceability to causes can be selected. At block 46, the evaluation or evaluations for model accuracy, complexity, and fidelity are selected. Measures for model accuracy, complexity, and fidelity can be selected. The order of importance for each criterion and a weight for each criterion based on the importance can also be selected.

At block 48, evaluation criteria for model deployment value (benefit) and cost can be selected. A non-exhaustive list includes: cost of scoring and deploying a pre-selected number of trained algorithmic models and predictive results; cost of false-positive prediction per categorical outcome variable; cost/desirability of false-positive prediction per categorical outcome variable; value of correct prediction per categorical outcome; cost for prediction error per continuous outcome variable; cost of acquiring data for each predictor variable; and cost of trained algorithmic model building and recalibration. One or more of the costs and values can be stratified by input values per class.

At block 50, other business criteria or criterion can be selected. A trained algorithmic models quality criterion for accuracy, complexity, fidelity, deployment, value, and cost can be selected. Each criteria listed in block 46 and 48 can be assigned a constraint. Also, constraints can be assigned for: trained algorithmic models performance value, cost or both; trained algorithmic models for model estimation cost; limits for trained algorithmic models deployment cost; maximum number of inputs for interpretability of trained algorithmic models; and criteria or criterion per variable against which to evaluate for discriminatory impact of algorithmic models.

Time complexity for deploying and scoring a trained algorithmic model can be considered. The amount of time taken to execute a single record of data (a single data point) can be especially relevant in a cloud scenario where billing is associated with resource utilization. Space complexity of deploying and scoring a trained algorithmic model can be considered. The amount of space consumed to execute a single data point can be used to tailor system resource allocation. The lesser the space consumed, the higher the number of data points that can be executed on the same hardware (example: Virtual machines, containers etc.).

Distribution comparison for deploying and scoring trained algorithmic models can be considered. A comparison between the distributions of target values from the training, testing, and holdout datasets compared to the predictions on the hold out dataset to evaluate model fit. On large number of observations, the distributions of observed and predicted values must be similar. Comparison of outputs from simulated data with respect to certain predictors, such as demographic properties, that would indicate bias and discriminatory impact of a trained algorithmic model can be considered.

A model refresh metric for deploying and scoring a trained algorithmic model can be considered. Deployed trained algorithmic models need to be periodically reviewed and refreshed in order to maintain relevance and performance. This metric captures information on how long it takes to re-train the same model again on fresh data. For instance, a linear regression model does not require much time to re-train. However, a complex neural network may consume significant system resources.

Differential importance of accuracy for sub-regions in predicted distributions can be considered. This metric captures information about the accuracy of predictions in sub-regions of the data (including the effect of misclassification costs). For example, a trained algorithmic model may be able to accurately predict churn rate for persons between 20 and 30 years old, but not for persons older than 30. If the most important and valuable demographic segment to the organization is the 20 to 30 year old segment, the model building and evaluation/comparison process should reflect this business preference/requirement. Such information can also be important for identifying patterns in the data and for data cleaning.

Constraint-based training of algorithmic models can be considered. During the training process, particular constraints on an algorithmic model can be selected. In a scenario where multiple models, e.g. AutoML or Model Grid Search, are generated, it can be useful to have some constraint-based training. For example, only models that can execute in less than 10 ms and take less than 5 MB space should be considered for production can be specified. This metric is useful in low resource scenarios like IoT (Internet of Things) or in cases where users have limited financial budget for deployment. Another type of constraint for time series (time-indexed) variables is to limit the smallest allowable lag-time for certain predictor variables in order to ensure that the values for those predictors are available when needed to support predictions in a low-latency real-time system.

Cost of data for deploying and scoring a trained algorithmic model can be considered. In some modeling and deployment scenarios, obtaining (measuring) the values for some predictor variables can be expensive. For example, when modeling customer data, specific household and demographic information may have to be purchased from data brokers; in manufacturing applications, certain measurements may require destructive or otherwise costly testing. Using this metric, the cost of acquiring data for specific predictors both for training (re-calibration) and for scoring new data points can be considered.

At block 52, each criterion can be assigned as a hard or soft criterion. A weight for each criterion denoting importance for each algorithmic model selection criterion can also be assigned. At block 54, the overall model desirability value is generated and presented to a user. The user can perform what if scenarios and analysis on the overall model desirability. At block 56, an algorithm model or models can be trained based on selected outcome and predictor variables, outcome and predictor variable types, model analytics types, any combination of a desirability function, and any modification made by the user. It should be understood that block 56 can be logically executed before or after block 54.

Figure 3:
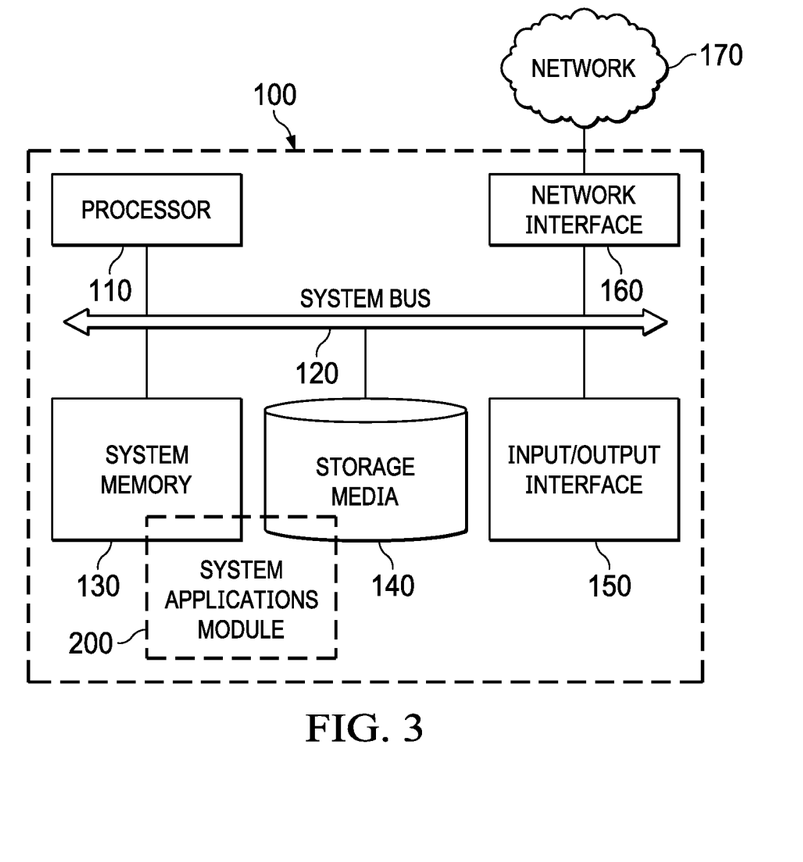
FIG. 3 is an illustration of a computing machine for processing data and selecting the optimal predictive model selection and executing the optimal predictive model, in accordance with certain example embodiments.

Referring now to FIG. 3, illustrated is a computing machine 100 and a system applications module 200, in accordance with example embodiments. The computing machine 100 can correspond to any of the various computers, mobile devices, laptop computers, servers, embedded systems, or computing systems presented herein. The module 200 can comprise one or more hardware or software elements designed to facilitate the computing machine 100 in performing the various methods and processing functions presented herein. The computing machine 100 can include various internal or attached components such as a processor 110, system bus 120, system memory 130, storage media 140, input/output interface 150, and a network interface 160 for communicating with a network 170, e.g. a loopback, local network, wide-area network, cellular/GPS, Bluetooth, WIFI, and WIMAX.

The computing machine 100 can be implemented as a conventional computer system, an embedded controller, a laptop, a server, a mobile device, a smartphone, a wearable computer, a customized machine, any other hardware platform, or any combination or multiplicity thereof. The computing machine 100 and associated logic and modules can be a distributed system configured to function using multiple computing machines interconnected via a data network and/or bus system.

The processor 110 can be designed to execute code instructions in order to perform the operations and functionality described herein, manage request flow and address mappings, and to perform calculations and generate commands. The processor 110 can be configured to monitor and control the operation of the components in the computing machines. The processor 110 can be a general purpose processor, a processor core, a multiprocessor, a reconfigurable processor, a microcontroller, a digital signal processor ("DSP"), an application specific integrated circuit ("ASIC"), a controller, a state machine, gated logic, discrete hardware components, any other processing unit, or any combination or multiplicity thereof. The processor 110 can be a single processing unit, multiple processing units, a single processing core, multiple processing cores, special purpose processing cores, co-processors, or any combination thereof. According to certain embodiments, the processor 110 along with other components of the computing machine 100 can be a software based or hardware based virtualized computing machine executing within one or more other computing machines.

The system memory 130 can include non-volatile memories such as read-only memory ("ROM"), programmable read-only memory ("PROM"), erasable programmable read-only memory ("EPROM"), flash memory, or any other device capable of storing program instructions or data with or without applied power. The system memory 130 can also include volatile memories such as random access memory ("RAM"), static random access memory ("SRAM"), dynamic random access memory ("DRAM"), and synchronous dynamic random access memory ("SDRAM"). Other types of RAM also can be used to implement the system memory 130. The system memory 130 can be implemented using a single memory module or multiple memory modules. While the system memory 130 is depicted as being part of the computing machine, one skilled in the art will recognize that the system memory 130 can be separate from the computing machine 100 without departing from the scope of the subject technology. It should also be appreciated that the system memory 130 can include, or operate in conjunction with, a non-volatile storage device such as the storage media 140.

The storage media 140 can include a hard disk, a floppy disk, a compact disc read-only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 140 can store one or more operating systems, application programs and program modules, data, or any other information. The storage media 140 can be part of, or connected to, the computing machine. The storage media 140 can also be part of one or more other computing machines that are in communication with the computing machine such as servers, database servers, cloud storage, network attached storage, and so forth.

The applications module 200 can comprise one or more hardware or software elements configured to facilitate the computing machine with performing the various methods and processing functions presented herein. The applications module 200 and other OS application modules can include one or more algorithms or sequences of instructions stored as software or firmware in association with the system memory 130, the storage media 140 or both. The storage media 140 can therefore represent examples of machine or computer readable media on which instructions or code can be stored for execution by the processor 110. Machine or computer readable media can generally refer to any medium or media used to provide instructions to the processor 110. Such machine or computer readable media associated with the applications module 200 and other OS application modules can comprise a computer software product. It should be appreciated that a computer software product comprising the applications module 200 and other OS application modules can also be associated with one or more processes or methods for delivering the applications module 200 and other OS application modules to the computing machine via a network, any signal-bearing medium, or any other communication or delivery technology. The applications module 200 and other OS application modules can also comprise hardware circuits or information for configuring hardware circuits such as microcode or configuration information for an FPGA or other PLD. In one exemplary embodiment, applications module 200 and other OS application modules can include algorithms capable of performing the functional operations described by the flow charts and computer systems presented herein.

The input/output ("I/O") interface 150 can be configured to couple to one or more external devices, to receive data from the one or more external devices, and to send data to the one or more external devices. Such external devices along with the various internal devices can also be known as peripheral devices. The I/O interface 150 can include both electrical and physical connections for coupling the various peripheral devices to the computing machine or the processor 110. The I/O interface 150 can be configured to communicate data, addresses, and control signals between the peripheral devices, the computing machine, or the processor 110. The I/O interface 150 can be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 150 can be configured to implement only one interface or bus technology. Alternatively, the I/O interface 150 can be configured to implement multiple interfaces or bus technologies. The I/O interface 150 can be configured as part of, all of, or to operate in conjunction with, the system bus 120. The I/O interface 150 can include one or more buffers for buffering transmissions between one or more external devices, internal devices, the computing machine, or the processor 120.

The I/O interface 120 can couple the computing machine to various input devices including mice, touch-screens, scanners, electronic digitizers, sensors, receivers, touchpads, trackballs, cameras, microphones, keyboards, any other pointing devices, or any combinations thereof. The I/O interface 120 can couple the computing machine to various output devices including video displays, speakers, printers, projectors, tactile feedback devices, automation control, robotic components, actuators, motors, fans, solenoids, valves, pumps, transmitters, signal emitters, lights, and so forth.

The computing machine 100 can operate in a networked environment using logical connections through the NIC 160 to one or more other systems or computing machines across a network. The network can include wide area networks (WAN), local area networks (LAN), intranets, the Internet, wireless access networks, wired networks, mobile networks, telephone networks, optical networks, or combinations thereof. The network can be packet switched, circuit switched, of any topology, and can use any communication protocol. Communication links within the network can involve various digital or an analog communication media such as fiber optic cables, free-space optics, waveguides, electrical conductors, wireless links, antennas, radio-frequency communications, and so forth.

The processor 110 can be connected to the other elements of the computing machine or the various peripherals discussed herein through the system bus 120. It should be appreciated that the system bus 120 can be within the processor 110, outside the processor 110, or both. According to some embodiments, any of the processors 110, the other elements of the computing machine, or the various peripherals discussed herein can be integrated into a single device such as a system on chip ("SOC"), system on package ("SOP"), or ASIC device.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions unless otherwise disclosed for an exemplary embodiment. Further, a skilled programmer would be able to write such a computer program to implement an embodiment of the disclosed embodiments based on the appended flow charts, algorithms and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the description herein.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. The scope of the claims is intended to broadly cover the disclosed embodiments and any such modification. Further, the following clauses represent additional embodiments of the disclosure and should be considered within the scope of the disclosure:

Clause 1, an apparatus for generating algorithmic models used for generating predictive analytics from a model data set for a process, the apparatus comprising: a desirability function module configured to generate a desirability function, wherein the desirability function define: at least one outcome variable and outcome variable type and at least one predictor variable and at least one predictor variable type; at least one algorithmic model accuracy criterion, at least one model analytics type, at least one evaluation criterion for algorithmic model quality, and at least one evaluation criterion for model deployment cost; and an automated machine learning module configured to: generate at least one algorithmic model having a variable set selected according to the desirability function; and train the at least one algorithmic model against the model data set;

Clause 2, the apparatus of clause 1, wherein the analytics model type includes at least one selected from a group comprising: an analytic method, an analytic algorithm, and an analytic approach;

Clause 3, the apparatus of clause 1, wherein the evaluation criterion for algorithmic model quality includes at least one from a group comprising: measures for algorithmic model accuracy; measures for algorithmic model complexity; and measures for algorithmic model fidelity;

Clause 4, the apparatus of clause 1, wherein the evaluation criterion for model deployment cost includes at least one from a group comprising: cost of scoring the at least one algorithmic model; cost of false-positive prediction per categorical outcome; cost of false-negative prediction per categorical outcome; value of correct prediction per categorical outcome; cost for prediction error per continuous outcome; cost of acquiring data for each predictor variable; and cost of model building and recalibration;

Clause 5, the apparatus of clause 4, wherein the cost of false-positive prediction per categorical outcome is stratified by each input value per class; wherein the cost of false-negative prediction per categorical outcome is stratified by each input value per class; wherein the value of correct prediction per categorical outcome is by each input value per class; and wherein cost for prediction error per continuous outcome is optionally stratified for each input value per class;

Clause 6, the apparatus of clause 1, wherein the desirability function further defines at least one from a group comprising: model quality criterion; model performance value; model performance cost; limits for model estimation cost; limits for model deployment cost; maximum number of inputs for interpretability of models; criteria for variables used to evaluate discriminatory impact of prediction models;

Clause 7, the apparatus of clause 1, wherein the desirability function further defines weights, hard limits, or a combination of weights and hard limits for one or more of the at least one algorithmic model accuracy criterion; and the at least one evaluation criterion for algorithmic model quality; the at least one evaluation criterion for model deployment cost;

Clause 8, a system for generating algorithmic models used for generating predictive analytics from a model data set for a process, the system comprising: a desirability function module configured to generate a desirability function, wherein the desirability function defines: at least one outcome variable and outcome variable type and at least one predictor variable and at least one predictor variable type; and at least one algorithmic model accuracy criterion, at least one model analytics type, at least one evaluation criterion for algorithmic model quality, and at least one evaluation criterion for model deployment cost; an automated machine learning module configured to: generate at least one algorithmic model having a variable set selected according to the desirability function; and train the at least one algorithmic model against the model data set; and a UI (User Interface) module configured to generate a user interface to display the at least one algorithmic model accuracy criterion, the at least one model analytics type, the at least one evaluation criterion for algorithmic model quality, and the at least one evaluation criterion for model deployment cost; wherein the displayed criteria and cost are selectable and definable;

Clause 9, the system of clause 8, wherein the evaluation criterion for algorithmic model quality includes at least one from a group comprising: measures for algorithmic model accuracy; measures for algorithmic model complexity; and measures for algorithmic model fidelity;

Clause 10, the system of clause 8, wherein the evaluation criterion for model deployment cost includes at least one from a group comprising: cost of scoring the at least one algorithmic model; cost of false-positive prediction per categorical outcome; cost of false-negative prediction per categorical outcome; value of correct prediction per categorical outcome; cost for prediction error per continuous outcome; cost of acquiring data for each predictor variable; and cost of model building and recalibration;

Clause 11, the system of clause 10, wherein the cost of false-positive prediction per categorical outcome is stratified by each input value per class; wherein the cost of false-negative prediction per categorical outcome is stratified by each input value per class; wherein the value of correct prediction per categorical outcome is by each input value per class; and wherein cost for prediction error per continuous outcome is optionally stratified for each input value per class;

Clause 12, the system of clause 8, wherein the desirability function further defines at least one from the group comprising: model quality criteria; model performance value; model performance cost; limits for model estimation cost; limits for model deployment cost; maximum number of inputs for interpretability of models; criteria for variables used to evaluate discriminatory impact of prediction models;

Clause 13, the system of clause 8, wherein the desirability function further defines weights, hard limits, or a combination of weights and hard limits for one or more of the at least one algorithmic model accuracy criterion; the at least one evaluation criterion for algorithmic model quality; the at least one evaluation criterion for model deployment cost;

Clause 14, a method for generating algorithmic models used for generating predictive analytics from a model data set for a process, the method comprising: generating a desirability function; defining at least one outcome variable and outcome variable type and at least one predictor variable and at least one predictor variable type; defining at least one algorithmic model accuracy criterion, at least one model analytics type, at least one evaluation criterion for algorithmic model quality, and at least one evaluation criterion for model deployment cost; generating at least one algorithmic model having a variable set selected according to the desirability function; training the at least one algorithmic model against the model data set; and generating a user interface to display the at least one algorithmic model accuracy criterion, the at least one model analytics type, the at least one evaluation criterion for algorithmic model quality, and the at least one evaluation criterion for model deployment cost; wherein the displayed criteria and cost are selectable and definable;

Clause 15, the method of clause 14, wherein the analytics model type includes at least one selected from a group comprising: an analytic method, an analytic algorithm, and an analytic approach;

Clause 16, the method of clause 14, wherein the evaluation criterion for algorithmic model quality includes at least one from a group comprising: measures for algorithmic model accuracy; measures for algorithmic model complexity; and measures for algorithmic model fidelity;

Clause 17, the method of clause 14, wherein the evaluation criterion for model deployment cost includes at least one from a group comprising: cost of scoring the at least one algorithmic model; cost of false-positive prediction per categorical outcome; cost of false-negative prediction per categorical outcome; value of correct prediction per categorical outcome; cost for prediction error per continuous outcome; cost of acquiring data for each predictor variable; and cost of model building and recalibration;

Clause 18, the method of clause 17, wherein the cost of false-positive prediction per categorical outcome is stratified by each input value per class; wherein the cost of false-negative prediction per categorical outcome is stratified by each input value per class; wherein the value of correct prediction per categorical outcome is by each input value per class; and wherein cost for prediction error per continuous outcome is optionally stratified for each input value per class;

Clause 19, the method of clause 14, further includes defining at least one from a group comprising: model quality criterion; model performance value; model performance cost; limits for model estimation cost; limits for model deployment cost; maximum number of inputs for interpretability of models; criteria for variables used to evaluate discriminatory impact of prediction models; and Clause 20, the method of clause 14, further includes defining weights, hard limits, or a combination of weights and hard limits for one or more of the at least one algorithmic model accuracy criterion; the at least one evaluation criterion for algorithmic model quality; and the at least one evaluation criterion for model deployment cost.

What is claimed is:

1. An apparatus for generating algorithmic models used for generating predictive analytics from a model data set for a process, the apparatus comprising:
   a desirability function module configured to generate a desirability function, wherein the desirability function define:
   at least one outcome variable and outcome variable type and at least one predictor variable and at least one predictor variable type; and
   at least one algorithmic model accuracy criterion, at least one model analytics type, at least one evaluation criterion for algorithmic model quality, and at least one evaluation criterion for model deployment cost,
   wherein the evaluation criterion for model deployment cost includes at least one from a group comprising: cost of scoring the at least one algorithmic model; cost of false-positive prediction per categorical outcome; cost of false-negative prediction per categorical outcome; value of correct prediction per categorical outcome; cost for prediction error per continuous outcome; cost of acquiring data for each predictor variable; and cost of model building and recalibration, and wherein the cost of false-positive prediction per categorical outcome is stratified by each input value per class; and
   an automated machine learning module configured to:
   generate at least one algorithmic model having a variable set selected according to the desirability function; and
   train the at least one algorithmic model against the model data set.

2. The apparatus of claim 1, wherein the evaluation criterion for algorithmic model quality includes at least one from a group comprising: measures for algorithmic model accuracy; measures for algorithmic model complexity; and measures for algorithmic model fidelity.

3. The apparatus of claim 1, wherein the cost of false-negative prediction per categorical outcome is stratified by each input value per class; wherein the value of correct prediction per categorical outcome is by each input value per class; and wherein cost for prediction error per continuous outcome is optionally stratified for each input value per class.

4. The apparatus of claim 1, wherein the desirability function further defines at least one from a group comprising: model quality criterion; model performance value; model performance cost; limits for model estimation cost; limits for model deployment cost; maximum number of inputs for interpretability of models; criteria for variables used to evaluate discriminatory impact of prediction models.

5. The apparatus of claim 1, wherein the analytics model type includes at least one selected from a group comprising: an analytic method, an analytic algorithm, and an analytic approach.

6. The apparatus of claim 1, wherein the desirability function further defines weights, hard limits, or a combination of weights and hard limits for one or more of the at least one algorithmic model accuracy criterion; the at least one evaluation criterion for algorithmic model quality; and the at least one evaluation criterion for model deployment cost.

7. A system for generating algorithmic models used for generating predictive analytics from a model data set for a process, the system comprising:
   a desirability function module configured to generate a desirability function, wherein the desirability function defines:
   at least one outcome variable and outcome variable type and at least one predictor variable and at least one predictor variable type; and
   at least one algorithmic model accuracy criterion, at least one model analytics type, at least one evaluation criterion for algorithmic model quality, and at least one evaluation criterion for model deployment cost,
   wherein the evaluation criterion for model deployment desirability includes at least one from a group comprising: desirability of scoring the at least one algorithmic model; desirability of false-positive prediction per categorical outcome; desirability of false-negative prediction per categorical outcome; value of correct prediction per categorical outcome; desirability for prediction error per continuous outcome; desirability of acquiring data for each predictor variable; and cost of model building and recalibration, and
   wherein the desirability of false-positive prediction per categorical outcome is stratified by each input value per class;
   an automated machine learning module configured to:
   generate at least one algorithmic model having a variable set selected according to the desirability function; and
   train the at least one algorithmic model against the model data set; and
   a UI (User Interface) module configured to generate a user interface to display the at least one algorithmic model accuracy criterion, the at least one model analytics type, the at least one evaluation criterion for algorithmic model quality, and the at least one evaluation criterion for model deployment cost;
   wherein the displayed criteria and cost are selectable and definable.

8. The system of claim 7, wherein the evaluation criterion for algorithmic model quality includes at least one from a group comprising: measures for algorithmic model accuracy; measures for algorithmic model complexity; and measures for algorithmic model fidelity.

9. The system of claim 7, wherein the evaluation criterion for model deployment cost includes at least one from a group comprising: cost of scoring the at least one algorithmic model; cost of false-positive prediction per categorical outcome; cost of false-negative prediction per categorical outcome; value of correct prediction per categorical outcome; cost for prediction error per continuous outcome; cost of acquiring data for each predictor variable; and cost of model building and recalibration.

10. The system of claim 7, wherein the desirability function further defines at least one from the group comprising: model quality criteria; model performance value; model performance cost; limits for model estimation cost; limits for model deployment cost; maximum number of inputs for interpretability of models; criteria for variables used to evaluate discriminatory impact of prediction models.

11. The system of claim 7, wherein the desirability function further defines weights, hard limits, or a combination of weights and hard limits for one or more of the at least one algorithmic model accuracy criterion; the at least one evaluation criterion for algorithmic model quality; the at least one evaluation criterion for model deployment cost.

12. A method for generating algorithmic models used for generating predictive analytics from a model data set for a process, the method comprising:
 generating a desirability function;
 defining at least one outcome variable and outcome variable type and at least one predictor variable and at least one predictor variable type;
 defining at least one algorithmic model accuracy criterion, at least one model analytics type, at least one evaluation criterion for algorithmic model quality, and at least one evaluation criterion for model deployment cost,
 wherein the evaluation criterion for model deployment cost includes at least one from a group comprising: cost of scoring the at least one algorithmic model; cost of false-positive prediction per categorical outcome; cost of false-negative prediction per categorical outcome; value of correct prediction per categorical outcome; cost for prediction error per continuous outcome; cost of acquiring data for each predictor variable; and cost of model building and recalibration, and
 wherein the cost of false-positive prediction per categorical outcome is stratified by each input value per class;
 generating at least one algorithmic model having a variable set selected according to the desirability function;
 training the at least one algorithmic model against the model data set; and
 generating a user interface to display the at least one algorithmic model accuracy criterion, the at least one model analytics type, the at least one evaluation criterion for algorithmic model quality, and the at least one evaluation criterion for model deployment cost;
 wherein the displayed criteria and cost are selectable and definable.

13. The method of claim 12, wherein the analytics model type includes at least one selected from a group comprising: an analytic method, an analytic algorithm, and an analytic approach.

14. The method of claim 12, wherein the evaluation criterion for algorithmic model quality includes at least one from a group comprising: measures for algorithmic model accuracy;
 measures for algorithmic model complexity; and measures for algorithmic model fidelity.

15. The method of claim 12, wherein the cost of false-negative prediction per categorical outcome is stratified by each input value per class; wherein the value of correct prediction per categorical outcome is by each input value per class; and wherein cost for prediction error per continuous outcome is optionally stratified for each input value per class.

16. The method of claim 12, further includes defining at least one from a group comprising: model quality criterion; model performance value; model performance cost; limits for model estimation cost; limits for model deployment cost; maximum number of inputs for interpretability of models; criteria for variables used to evaluate discriminatory impact of prediction models.

17. The method of claim 12, further includes defining weights, hard limits, or a combination of weights and hard limits for one or more of the at least one algorithmic model accuracy criterion; the at least one evaluation criterion for algorithmic model quality; and the at least one evaluation criterion for model deployment cost.

* * * * *